United States Patent [19]

Ghazizadeh

[11] Patent Number: 5,135,189
[45] Date of Patent: Aug. 4, 1992

[54] BABY BOTTLE HOLDER

[76] Inventor: Mansoor Ghazizadeh, 2 Chesham Way, Fairport, N.Y. 14450

[21] Appl. No.: 746,334

[22] Filed: Aug. 16, 1991

[51] Int. Cl.[5] .............................................. A47D 15/00
[52] U.S. Cl. ....................................... 248/104; 248/160; 248/276
[58] Field of Search ..................... 248/104, 103, 311.3, 248/276, 102, 105, 106, 160

[56] References Cited

U.S. PATENT DOCUMENTS

| 751,233 | 2/1904 | White | 248/103 |
| 1,128,046 | 2/1915 | Reyman | 248/103 |
| 1,786,459 | 12/1930 | Simons | 248/104 |
| 3,111,296 | 11/1963 | Ludes | 248/103 |
| 3,180,600 | 4/1965 | Kopec | 248/104 |
| 5,016,845 | 5/1991 | Pellegrino | |

FOREIGN PATENT DOCUMENTS 348780 10/1960 Switzerland .................... 248/104

Primary Examiner—J. Franklin Foss
Attorney, Agent, or Firm—Howard J. Greenwald

[57] ABSTRACT

An apparatus for holding a baby bottle is disclosed. This device contains means for gripping the bottle and a flexible arm. The gripping means contains a base and, integrally formed therewith, at least two fingers extending from the base. Each of the fingers contains a top portion which extends divergingly away from the top portions of each of the other fingers.

20 Claims, 4 Drawing Sheets

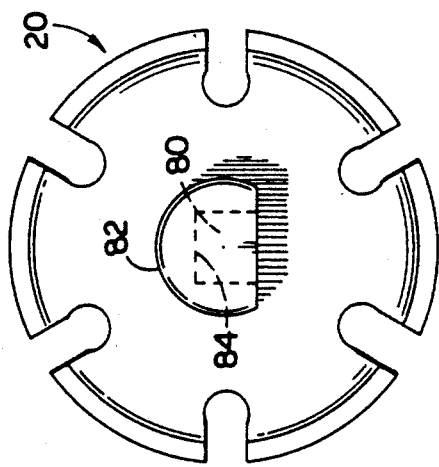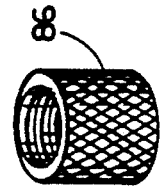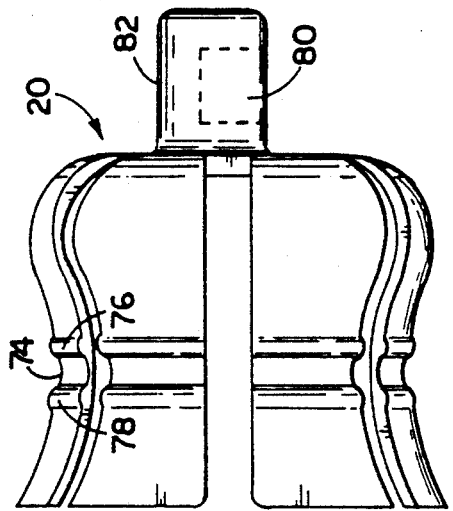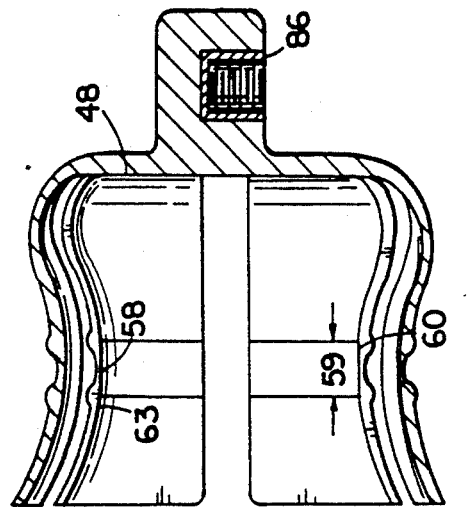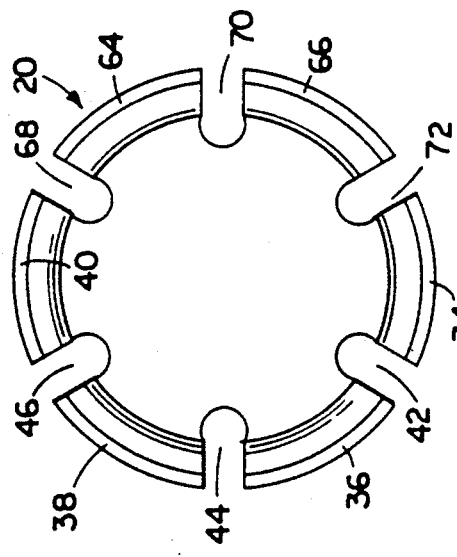

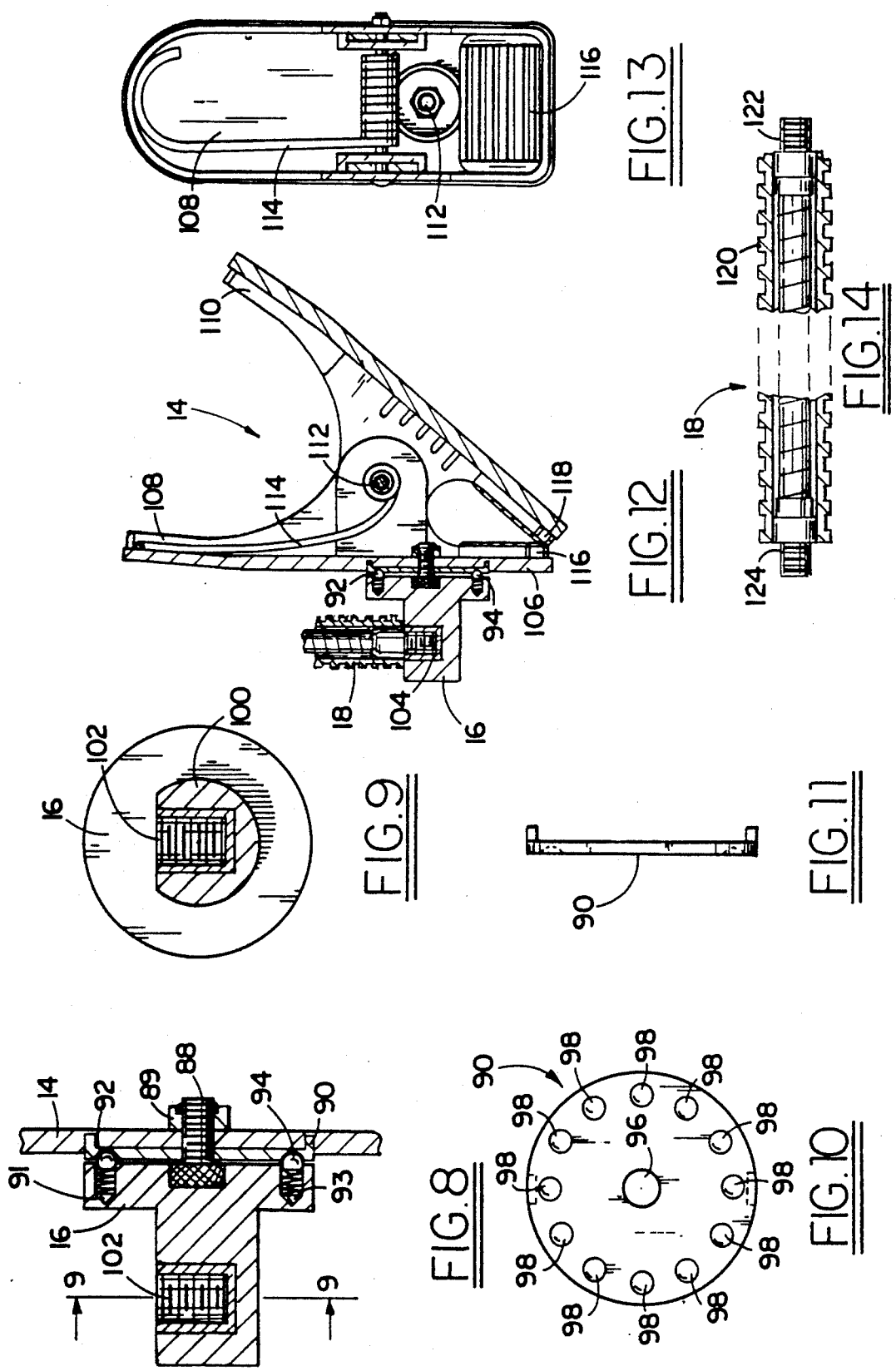

5,135,189

BABY BOTTLE HOLDER

FIELD OF THE INVENTION

A device for holding a baby bottle in place while it is being used by an infant is disclosed.

BACKGROUND OF THE INVENTION

Devices for holding baby bottles are well known to those skilled in the art. These devices are often used to hold the nursing bottle during the feeding of an infant.

As early as 1930 a baby bottle holder was disclosed, in U.S. Pat. No. 1,786,459 of Burdick Simons. The device of the Simons patent comprised a base, and an arm attached to the base; the base was of a size and weight sufficient to maintain the bottle holder in an upright position when the base rested on a supporting surface, and it had a clamping member attached to it.

The baby-bottle holder of the Simons patent was relatively heavy and awkward. Its flexible arm 2, which was attached to a baby bottle holder and a clamp, was "... of an old ... construction ... of the type employed ... in connection with table and desk lamps". However, in order to provide a reasonable range of adjustment for the arm of Simon's device, a relatively long and heavy flexible arm had to be used. Because of the length of the arm, it had to be stronger and heavier to support the weight at its ends. Its increased length and weight made it difficult to use, especially when clamped close to the infant using the device.

The flexible arm 2 of the device of the Simon patent is attached to a bottle clip 4, which is adapted to receive a baby bottle. When a baby bottle is inserted into clip 4, flexible arm 2 is substantially parallel to the longitudinal axis of the bottle and substantially perpendicular to the surface of the clamp used in his device. Because of this means of connection, the when it is desired to connect the Simons bottle holder at a point close to an infant, flexible arm 2 must be twisted and turned in contorted position.

The clip 4 of the Simons patent is comprised of concave parallel fingers 5 and 6. In order to use the device of Simons, one has to, with a substantial amount of force, first spread fingers 5 and 6 apart, insert the baby bottle therebetween, and then allow such fingers to grip the bottle.

It is an object of this invention to provide a baby bottle holder which can readily be attached to or removed from either a crib, a baby's car seat, a baby stroller, a baby carrier, and the like.

It is another object of this invention to provide a baby bottle holder which is relatively lightweight.

It is another object of this invention to provide a baby bottle holder which is comprised of more than one means for varying the position of the baby bottle.

It is yet another object of this invention to provide a baby bottle holder which is relatively compact.

It is yet another object of this invention to provide a baby bottle holder comprised of means for readily and easily inserting the baby bottle into the holder.

SUMMARY OF THE INVENTION

In accordance with this invention, there is provided a baby bottle holder comprised of a flexible arm attached to a surface, and a means for gripping a baby bottle, attached to said flexible arm. The means for gripping the baby bottle contains several flexible fingers defining a mouth portion with diverging surfaces.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIG. 3 is a side view of the bottle gripper used in the bottle holder of FIG. 1;

FIG. 4 is a top view of the bottle gripper of FIG. 3;

FIG. 5 is a bottom view of the bottle gripper of FIG. 3;

FIG. 6 is a side sectional view of the bottle gripper of FIG. 3;

FIG. 7 illustrates one insert which may be used to connect the flexible arm of the bottle holder of FIG. 2 with the bottle gripper of FIG. 3;

FIG. 8 is a sectional view of the rotary stem used in the bottle holder of FIG. 2;

FIG. 9 is another sectional view of the rotary stem;

FIG. 10 is a view of a means for rotating the stem of FIG. 8;

FIG. 11 is a side view of the rotary means of FIG. 10;

FIG. 12 is a side view of the clip, the rotary stem, and a portion of the attached flexible arm of the bottle holder of FIG. 2;

FIG. 13 is partially broken away view of the clamp of the bottle holder of FIG. 2; and FIG. 14 is partial sectional view of the flexible arm used in the bottle holder of FIG. 2.

DESCRIPTION OF THE PREFERRED EMBODIMENTS

Figure 1:
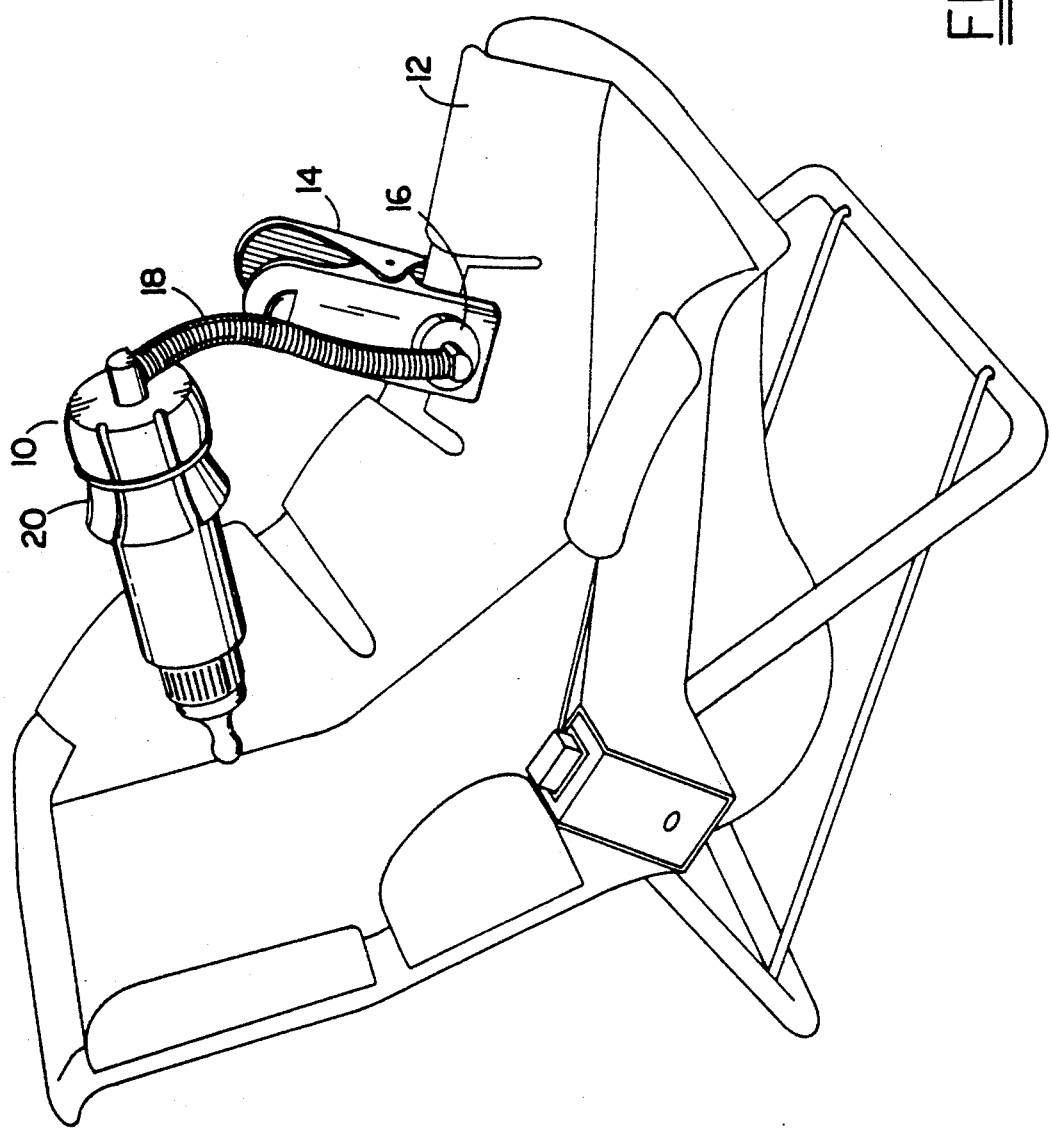
FIG. 1 is a perspective view of one preferred embodiment of the baby bottle holder of this invention attached to a infant carrier.

FIG. 1 illustrates one preferred baby bottle holder 10 of this invention in use on a baby carrier 12. Because of its ease of use, flexibility, compactness, and relatively light weight, baby bottle holder 10 may readily be used on a variety of different surfaces such as, e.g., the surfaces of a baby's crib, a stroller, a car seat, a high chair, and the like.

In one preferred embodiment, baby bottle holder weighs less than 1 pound. In an even more preferred embodiment, baby bottle holder 10 weights less than about 0.75 pounds.

Referring again to FIG. 1, it will be seen that, in the embodiment of this Figure, baby bottle holder 10 is preferably comprised of clamp 14, rotary stem 16, flexible arm 18, and bottle gripper 20.

Baby bottle holder 10 is substantially more compact than prior art baby bottle holders. When flexible arm 18 is fully extended so that the distance 22 between the bottom surface 24 of clamp 14 to the top surface 26 of the gripper 20 is maximized, such maximum distance between surfaces 24 and 26 of gripper 20 and clamp 14 is less than about 1.5 feet and, more preferably, is less than about 1.25 feet.

Referring again to FIG. 2, it will be seen that baby bottle holder 10 is comprised of a gripper 20. This gripper 20 is preferably connected to flexible arm 18 in such a manner that such flexible arm 18 is substantially perpendicular to the longitudinal axis of gripper 20 at the point at which said flexible arm 18 is attached to said gripper. As used in this specification, the term "substantially perpendicular" refers to an angle of from about 45 to about 135 degrees and, more preferably, from about 75 to about 105 degrees. Thus, referring to FIG. 2, in the embodiment depicted, and at attachment point 28, flexible arm 18 forms an angle with longitudinal axis 30 of about 90 degrees.

The advantage of attaching flexible arm 18 to gripper 20 so that, at the point of attachment, the flexible arm 18 is not substantially parallel to the gripper, is that one can use a shorter and lighter flexible arm 18 and, thus, provide a device with more flexibility.

In one preferred embodiment, flexible arm 18, when extended to its maximum length, has a length of less than about 1.0 foot.

Referring again to FIG. 2, in the embodiment depicted in this Figure, gripper 20 is comprised of, and integrally attached to, a means 32 for removably attaching flexible arm 18 to gripper 20.

The gripper 20 is comprised of a multiplicity of resilient and flexible fingers 34, 36, 38, and 40, separated from each other by slots 42, 44, and 46. The flexible fingers 34, 36, 38, and 40 preferably define a gripper with a divergent-convergent-divergent ("bell") shape. Thus, referring again to FIG. 2, and as one proceeds from gripper base 48 to gripper end 50, the maximum cross-sectional dimension of the gripper (which is its diameter in the case of a cylindrically-shaped gripper, increases to point 52, decreases to about point 54, and increases to about point 56.

It will be apparent to those skilled in the art that other shapes may be defined by said fingers, as long as the mouth 57 of said gripper is formed by resilient fingers which are diverging from each other. Thus, by way of illustration, as one proceeds from gripper base 48 to gripper end 50, the flexible fingers could continuously diverge from each other.

It is preferred that the gripper 20 be comprised of at least 2 of said resilient fingers, and preferably at least about 4 of said resilient fingers. In an even more preferred embodiment, gripper 20 is comprised of at least about 6 of said resilient fingers. Each of said fingers is preferably comprised of a divergent, convergent, and divergent section.

Figure 2:
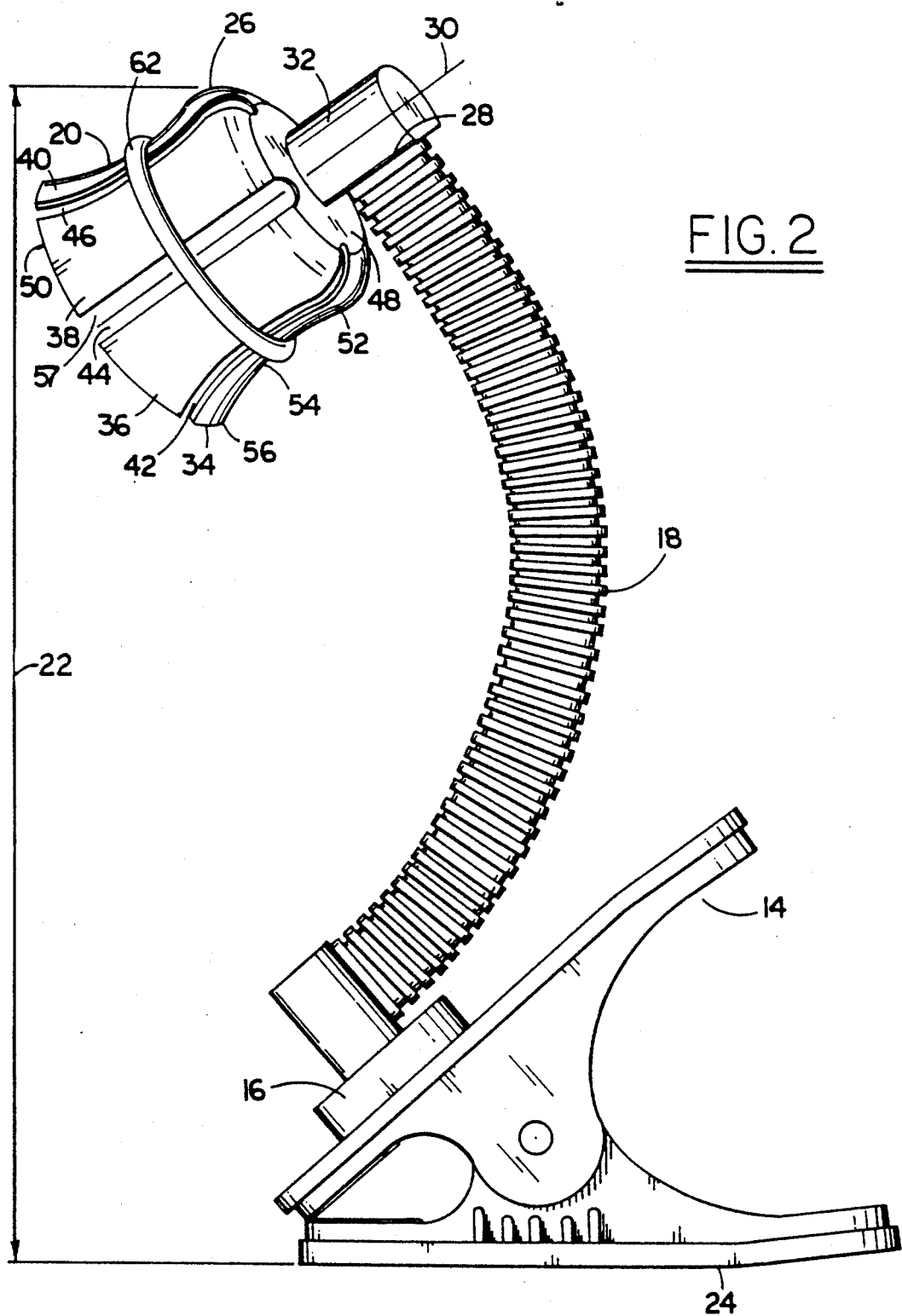
FIG. 2 is a perspective view of the baby bottle holder of FIG. 1.

In one embodiment, not shown in FIG. 2, the convergent section of the gripper 20 is comprised of an interior surface which is substantially flat so as to increase the area of the surface which can contact the baby bottle inserted into the gripper. Referring to FIG. 6, flat surfaces 58 and 60 illustrate this embodiment. It will be seen that, referring to FIG. 6, the flat surfaces 58 and 60 exist only in the interior surfaces of convergent section 54. In general, each of flat surfaces 58 and 60 have a length 59 which is preferably from about 0.1 to about 0.5 inches.

In another embodiment, not shown, flat surfaces 58 and 60 are substantially parallel to each other and extend substantially from base 48 to point 63 (see FIG. 6); thereafter the interior surfaces defined by the fingers diverge from each other.

Many other configurations will be apparent to those skilled in the art. What each of them must have in common, however, is that the gripper be comprised of at least two resilient fingers, at least two slots, and a funnel-shaped mouth defined by diverging surfaces.

Referring again to FIG. 2, the divergent--convergent--divergent fingers which preferably define the shape of gripper 20 preferably consist essentially of a thermoplastic material. As is known to those skilled in the art, a thermoplastic is a high polymer that softens when exposed to heat and returns to its original condition when cooled to room temperature. Suitable thermoplastics include nylon, fluorocarbons, linear polyethylene, polystyrene, polypropylene, and acrylic resins.

It is preferred that the thermoplastic material be one which can be readily injection molded. Thus, by way of illustration and not limitation, one may use acrylic resins, the common vinyl resins, and the like. These and other suitable resins are described in the Mid-October 1990 issue of "Modern Plastics", Volume 67, Number 11 (McGraw-Hill, Highstown, N.J.).

In one preferred embodiment, gripper 20 consists essentially of a material selected from the group consisting of polystyrene and acrylonitrile--butadiene--styrene copolymer. The polystyrene used preferably has a specific gravity of from about 1.054 to about 1.070. The "ABS" plastic used preferably has a specific gravity of from about 1.02 to about 1.25.

Referring again to FIG. 2, in the preferred embodiment depicted therein, it will be seen that fingers 34, 36, 38, and 40 are contiguous with and encompassed by O-ring 62. This O-ring 62 is preferably disposed within a groove (not shown) defined within the outer surfaces of the fingers 34, 36, 38, and 40.

The function of O-ring 62 is to compress fingers 34, 36, 38, and 40 inwardly in order to amplify the grip of such fingers upon the baby bottle inserted therebetween. It will be apparent to those skilled in the art that other means for compressing the fingers inwardly also may be used. Thus, for example, means 62 may comprise a cammed surface which, when rotated in a specified direction, will compress the fingers and when rotated in the opposite direction will release tension from the fingers. Thus, for example, means 62 may comprise a rubber band, or a spring, or any other means well known to those skilled in the art for compressing and conforming a body.

It is preferred that means 62 consist essentially of an elastomeric material. As is known to those skilled in the art, an elastomer is a macromolecular material that returns rapidly to approximately its initial dimensions and shape after substantial deformation by a weak stress and release of the stress. Suitable elastomers include natural rubber, styrene-butadiene copolymer, polychloroprene (neoprene), nitrile rubber, butyl rubber, polysulfide rubber ("Thiokol"), cis-1,4-polyisoprene, ethylene-propylene terpolymers (EPDM rubber), silicone rubber, polyurethane rubber, and the like.

FIG. 3 illustrates one preferred means for removably attaching compressing means 62 to the gripper 20. In the preferred embodiment illustrated in FIG. 3, O-ring groove 74 is defined by annular ridges 76 and 78.

FIG. 3 also illustrates a means 80 for attaching flexible arm 18 (not shown in FIG. 3) to gripper 20. This means 80, which preferably is integrally formed with gripper 20, is shown in more detail in FIGS. 6 and 7.

FIG. 4 is a top view of gripper 20, illustrating a preferred embodiment in which said gripper is comprised of resilient fingers 34, 36, 38, 40, 64, and 66 as well as slots 42, 44, 46, 68, 70, and 72 defined by said fingers.

FIG. 5 is an end view of gripper 20. Referring to both FIGS. 3 and 5, it will be seen that projection 82 is preferably integrally connected to gripper 20 and is comprised of orifice 80, which is adapted to be connected to flexible arm 18. The flexible arm 18 (not shown) will contact the interior surface 84 of orifice 80 and, at the point of such contact, will be substantially parallel to said interior surface. Consequently, the flexible arm 18 will be substantially perpendicular to the longitudinal axis 30 (not shown in FIG. 5) of gripper 20.

FIG. 6 illustrates gripper 20 without the O-ring 62 in place. It also illustrates one preferred orifice 80 adapted to be connected to flexible arm 18. Referring to FIG. 6, it will be seen that, in this embodiment, orifice 80 is comprised of an insert 86 which is comprised of internal threads. This insert may be friction fit into orifice 80. Alternatively, it may be molded into orifice 80. In either event, it is adapted to receive and be connected to external threads on a portion of flexible arm 18.

It will be apparent to those skilled in the art that other means may be used to connect flexible arm 18 to gripper 20. Thus, one may use adhesive. Thus, one may mold threads within orifice 80 and dispense with the need for an insert 86. Other attachment means will be apparent to those skilled in the art.

FIG. 8 illustrates one preferred means for joining flexible arm 18 (not shown in FIG. 8) to clamp 14. In the preferred embodiment illustrated in FIG. 8, a rotatable stem 16 is rotatably attached to claim 14.

Any means known to those skilled in the art may be used to provide means for rotatably attaching stem 16 to clamp 14. In the preferred means illustrated in FIG. 6, screw 88 connects stem 16, ball bearing base 90, and clamp 14, and it is preferably secured thereto by locknut 89; and spring-loaded ball bearings 92 and 94 ride in depressions formed in ball bearing base 90. Spring-loaded ball bearings 92 and 94 are disposed within orifices 91 and 83 formed within stem 16.

FIG. 10 is a top view of ball bearing base 90; and FIG. 11 is a side view of said base. Screw 88 (not shown) is adapted to extend through orifice 96. Spring-loaded ball bearings 92 and 94 are adapted to be received in depressions. It will thus be apparent to those skilled in the art that, by turning stem 16, stem 16 can be rotated into a multiplicity of different positions and then locked into any of these positions.

FIG. 9 illustrates one preferred means for attaching flexible arm 18 to stem 16. Referring to FIG. 9, it will be seen that projection 100 is preferably integrally formed with stem 16 and contains orifice 102. The means depicted in FIG. 9 for attaching one end of flexible arm 18 are substantially identical to the means depicted in FIG. 6 for attaching the other end of flexible arm 18. However, as will be apparent to those skilled in the art, other attachment means may be used. It is preferred, regardless of which attachment means is used, to provide a means for attaching flexible arm 18 so that said flexible arm, at its attachment point to stem 16, be substantially parallel to one of the surfaces of the sides of the clamp. Thus, referring to FIG. 12, it will be noted that, at point 104, flexible arm 18 is substantially parallel to clamp surface 106, forming an angle therewith of from about 0 to about 40 degrees.

FIG. 12 illustrates one preferred clamping means 14 which may be used in the invention. In this embodiment, clamp 14 is comprised of a first clamping member 108, a second clamping member 110, means 112 for pivotally attaching members 108 and 110 (such as bolt 112), and a spring 114. In this preferred embodiment, clamp 14 also contains rubber surfaces 116 and 118.

It is preferred that, with the exception of the rubber surfaces 116 and 118, attachment means 112, and the spring 114, substantially all of the material in clamp be is comprised of plastic material. Any of the plastic materials mentioned above as being suitable for gripper 20 may be used in clamp 14. It is preferred that at least about 80 weight percent of the material in clamp 14 be a thermoplastic material.

It will be apparent to those skilled in the art that many different clamping means may be used as means 14, as long as said means are preferably comprised of means for attaching flexible arm 18 so that, at its point of attachment with the clamp 14, it is substantially parallel to the clamp's surface. In one preferred embodiment, not shown, the flexible arm 18 is connected directly to a fixed surface without the use of clamp.

FIG. 13 illustrates arm 108 of clamp 14.

FIG. 14 illustrates the flexible arm 18. Flexible arms of this type are well known to those skilled in the art and are described, for example, in U.S. Pat. No. 1,786,459 of Simons, the disclosure of which is hereby incorporated by reference into this specification. Thus, for example, it is known that arms of this type are usually formed from a flexible conduit made from a metal strip which is wound into a spiral. The inside of this conduit is filled with a bundle of flexible nonresilient metal wires. The conduit and the wires are adapted to be bent into any desired position; and, since the wires are not resilient but are soft and pliable, the arm will remain in any position to which it is bent and will also have sufficient strength to support various objects.

Referring again to FIG. 14, it will be seen that flexible arm 18 is preferably comprised of a plastic cover 120, means 122 for connecting flexible arm 18 to orifice 80, and means 124 for connecting flexible arm 18 to orifice 102. Other means for attaching the flexible arm to clamp 14 and/or the gripper 20 will be apparent to those skilled in the art.

In one embodiment, not shown, flexible arm 18 is adjustably attached to either gripper 20 and/or stem 16 by conventional attachment means providing such adjustability. It will be apparent to those skilled in the art that such adjustable attachment means, for each end of the flexible arm 18, will allow (but not require) such end to be in its desired configuration. Thus, for example, such adjustable attachment will allow one end of the flexible arm 18 to be substantially perpendicular to the gripper 20. Thus, for example, such adjustable attachment will allow the other end of flexible arm 18 to be substantially parallel to a surface of clamp 14. Because such adjustable attachments allow the ends of flexible arm 18 to be in the desired configuration, they are within the scope of applicant's claimed invention.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. An apparatus for holding a baby bottle comprised of means for gripping said bottle, a flexible arm with a first end and a second end, means for connecting said first end of said flexible arm to said gripping means, and means for connecting said second end of said flexible arm to a fixed surface, wherein:

(a) said means for gripping said bottle is comprised of a base and, integrally formed therewith, at least two fingers extending from said base separated from each other by at least one slot;
(b) each of said fingers is comprised of an top portion;
(c) said top portions of said fingers define a mouth adapted to receive a baby bottle; and
(d) each of said top portions of said fingers extends divergingly away from each of said other top portions.
(e) said means for connecting said first end of said flexible arm to said gripping means allows said first end to be substantially perpendicular to said gripping means;
(f) said means for connecting said second end of said flexible arm to said fixed surface is comprised of means for rotatably connecting said second end of said flexible arm to said gripping means and for rotating said flexible arm in a plane which may be substantially parallel to said fixed surface; and
(g) when said flexible arm is fully extended to its maximum length, the distance between said means for gripping said bottle and said clamp is less than about 1.5 feet.

2. The apparatus as recited in claim 1, wherein the bottom portion of each of said fingers extend divergingly from the bottom portion of each of the other of said fingers.

3. The apparatus as recited in claim 2, wherein the middle portion of each of said fingers extends convergingly towards the middle portion of each of the other of said fingers.

4. The apparatus as recited in claim 3, wherein said means for connecting said first end of said flexible arm to said gripping means allows said first end to be substantially perpendicular to said gripping means.

5. The apparatus as recited in claim 3, wherein said means for connecting said second end of said flexible arm to said fixed surface allows said second end to be substantially parallel to said fixed surface.

6. The apparatus as recited in claim 3, wherein said apparatus weighs less than about 1 pound.

7. The apparatus as recited in claim 3, wherein said means for connecting said second end of said flexible arm to a fixed surface is a clamp.

8. The apparatus as recited in claim 7, when said flexible arm is fully extended to its maximum length, the distance between said means for gripping said bottle and said clamp is less than about 1.5 feet.

9. The apparatus as recited in claim 3, wherein said gripper is comprised of at least four resilient fingers extending from said base.

10. The apparatus as recited in claim 3, wherein said resilient fingers consist essentially of thermoplastic material.

11. The apparatus as recited in claim 3, wherein said apparatus is comprised of means for compressing said resilient fingers.

12. The apparatus as recited in claim 11, wherein said means for compressing said resilient fingers is an O-ring which is contiguous with each of said fingers.

13. The apparatus as recited in claim 12, wherein said O-ring consists essentially of elastomeric material.

14. The apparatus as recited in claim 13, wherein said ring is removably attached to said fingers.

15. The apparatus as recited in claim 14, wherein said ring is disposed within a groove defined within the outer surfaces of said resilient fingers.

16. The apparatus as recited in claim 7, wherein said apparatus is comprised of means for rotatably connecting said second end of said flexible arm to said clamp.

17. The apparatus as recited in claim 16, wherein said means for rotatably connecting said second end of said flexible arm to said clamp is comprised of a stem rotatably connected to said clamp.

18. The apparatus as recited in claim 17, wherein said stem is comprised of a projection with an orifice adapted to connect to said second end of said flexible arm.

19. The apparatus as recited in claim 3, wherein said flexible arm is comprised of a flexible core and a cover encasing said core.

20. The apparatus as recited in claim 17, wherein said clamp is comprised of two elastomeric gripping sections.

* * * * *